Figure 1:
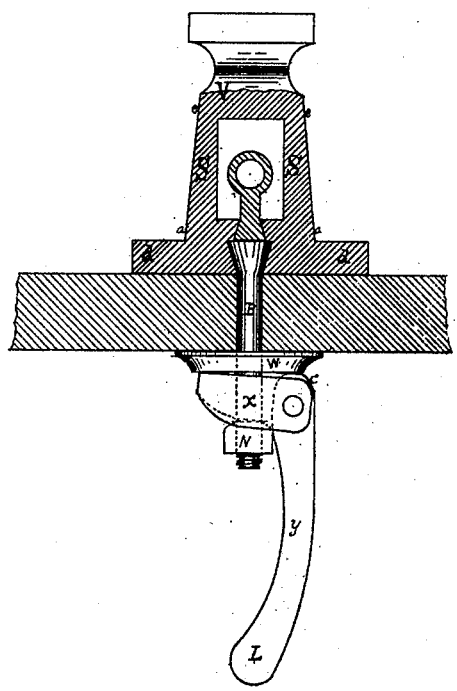
Figure 2:
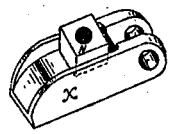

A. Dick,
Vise.
No. 108,335.   Patented Oct. 18, 1870.

Witnesses.   Inventor.
   Alexander Dick

United States Patent Office.

ALEXANDER DICK, OF BUFFALO, NEW YORK.

Letters Patent No. 108,335, dated October 18, 1870.

IMPROVEMENT IN VISES.

The Schedule referred to in these Letters Patent and making part of the same.

*To all whom it may concern:*

Be it known that I, ALEXANDER DICK, of Buffalo, in the State of New York, have invented a new and improved Swivel-Vise, with Cam-Wrench; and I do hereby declare that the following is a full and exact description thereof, reference being had to the accompanying drawing, in which—

Figure I is a front section view of the fixed part of a bench-vise made according to my plan, with its fastening-attachment.

Figure II is a view further delineating a part of said attachment.

My invention is twofold:

First, the fixed part of the swivel-vise V, Fig. I, I prefer to make with its bolt B cast firmly into its circular base D D, and its sides S S sloping outwardly, giving a greater strength of metal at the lower part $a$ than at the upper part $e$. In other respects it may be made in any of the known ways, but I prefer it as above stated, for thus the bolt B, if its head be properly formed, can never turn or draw from its socket, and the vise is very much stronger when the sides S S are thus formed, though the casting itself be no heavier, for there is increased strength where the casting is most likely to break. Any one skilled in the art can make the casting V, with the bolt B, formed and placed as indicated, in the way and manner that is usual in such cases.

Second, the fastening-attachment $x\ y$, Fig. I, I call a cam-wrench, and is novel in design and use. It consists of two parts, $x$ and $y$, which may very fitly be made of iron, and cast in the form required.

These parts are hinged together with a pin, as shown in figure, the end $c$ of $y$ being inserted in a slot in the end of $x$.

The end $c$ of $y$ is an eccentric or cam, as pivoted to $x$, and is operated by the lever L, the other end of $y$.

In the center of the part $x$ there is a hole, slightly larger than the bolt B which is passed through it, and its two sides extend downward, in the form of flanges, so as to receive the nut N of the bolt B.

These flanges are shown in Fig. II, where $x$ is in a reversed position.

I will now explain the use and action of this machine:

Let the vise to be held be placed in position, with the bolt B passing through and under the bench, (see Fig. I.) The washer W is now passed upon the bolt B and the cam-wrench $x\ y$, as shown in figure. The nut N is now screwed upon the bolt B a short distance, the part $x$ being held above and clear of it. The part $x$ may now be allowed to come down upon the nut N, which it receives in part, as in socket, within its flanges, which embrace it closely on two sides. Let now the lever L be extended by raising it, if necessary, and it will operate the nut N on B as a wrench, the flanges of $x$ turning the nut N, while it is itself turned on B with the lever L. In this manner let the nut N be screwed upon B till the washer W comes in contact with the lower surface of the bench, the part $y$ being, at the same time, in the same direction with the part $x$, for in this position the throw of the cam $c$ is not made. Let now the lever L be forced downward, the throw of the cam will, at the same time, be made, and should be completed when $y$ comes to the vertical position.

The throw of the cam will force the end of the lever $x$, to which it is attached away from the washer W, on which it acts. At the same time, the force of this action will be communicated to the nut N and to the bolt B, and will hold the vise firmly in position.

Let it be observed that, if the nut N be square, which is the form I approve, there will be four different positions of $x$ upon it, so that an adjustment may always be made so as to leave $y$ in any desired direction, while, at the same time, the throw of the cam shall be completed with the desired degree of force.

It will be noticed that, by simply raising the lever L, the vise is loosened, so that it may be turned to any angle with the bench that may be desired, and, by again lowering the lever, it is secured in that position.

The advantage of this machine lies not only in its great convenience, but also in its immense power.

The power of the cam is greater than that of the screw; but, the part $x$ being a lever of the second kind, if its arms are equal, this great power of the cam is duplicated in holding the vise firmly.

It is obvious that this cam-wrench may be applied to many other uses beside the one described above, such as the fastening down of lathe-heads, &c. Generally, it may be used to advantage in all cases where it is desirable to apply much force in drawing upon a rod or bolt, or where it is an object to be able to apply and remove such force with facility.

I do not, in this invention, claim any addition of parts to the swivel-vises now in use, except in so far as the cam-wrench $x\ y$ may be considered such addition; but

I claim—

1. The form, described and shown, of the part V, and, jointly with said part, the bolt B, connected thereto by casting the part V upon and around the head of said bolt, as set forth.

2. The combination of the clamping devices $x\ y$ with the nut N, washer W, and bolt B, substantially as described.

ALEXANDER DICK.

Witnesses:
LYMAN P. PERKINS,
A. B. TOWNLEY.